Feb. 5, 1924.

A. E. HALL 1,482,555

MOLD FOR MAKING FABRIC DISKS FOR VEHICLE WHEELS

Original Filed Oct. 10, 1922    2 Sheets-Sheet 1

Witnesses:

Inventor
Allen E. Hall
By Joshua R. H. Potts
His Attorney

Feb. 5, 1924.                                                                    1,482,555
A. E. HALL
MOLD FOR MAKING FABRIC DISKS FOR VEHICLE WHEELS
Original Filed Oct. 10, 1922          2 Sheets-Sheet 2

Witnesses:
Lynn Brodton
Elizabeth Garle

Inventor
Allen E. Hall
By Joshua R. H. Potts
His Attorney

Patented Feb. 5, 1924.

1,482,555

UNITED STATES PATENT OFFICE.

ALLEN E. HALL, OF PHILADELPHIA, PENNSYLVANIA, ASSIGNOR TO HALL WHEEL CORPORATION, OF PHILADELPHIA, PENNSYLVANIA, A CORPORATION OF PENNSYLVANIA.

MOLD FOR MAKING FABRIC DISKS FOR VEHICLE WHEELS.

Application filed October 10, 1922, Serial No. 593,568. Renewed December 26, 1923.

*To all whom it may concern:*

Be it known that I, ALLEN E. HALL, a citizen of the United States, residing at Philadelphia, in the county of Philadelphia and State of Pennsylvania, have invented certain new and useful Improvements in Molds for Making Fabric Disks for Vehicle Wheels, of which the following is a specification.

In my co-pending application Serial No. 593,569, filed of even date herewith, I have described an annular disk of woven and laminated material, impregnated with rubber and vulcanized, and adapted to serve as connecting and shock-absorbing means between the rim and hub of a disk wheel. The object of the present invention is to provide a mold especially adapted for the production of such disks and in which the vulcanization may be effected.

This object, and other advantageous ends which will be described hereinafter, I attain in the following manner reference being had to the accompanying drawings in which—

Figure 1:
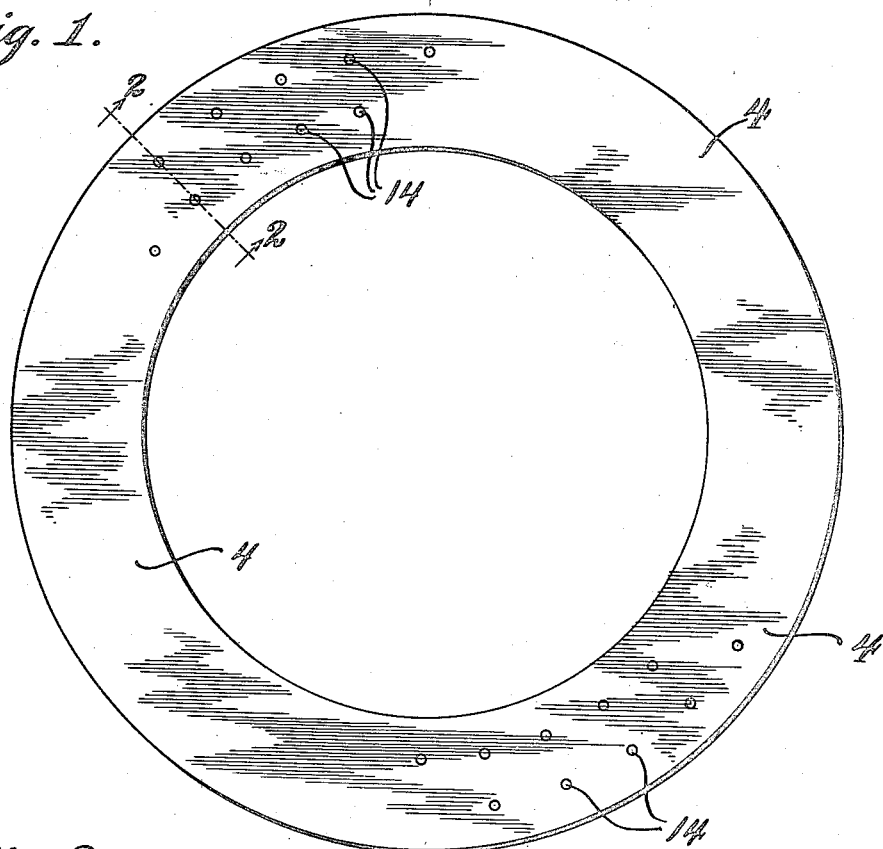
Figure 1 is a top plan view of the mold.
Figure 2:
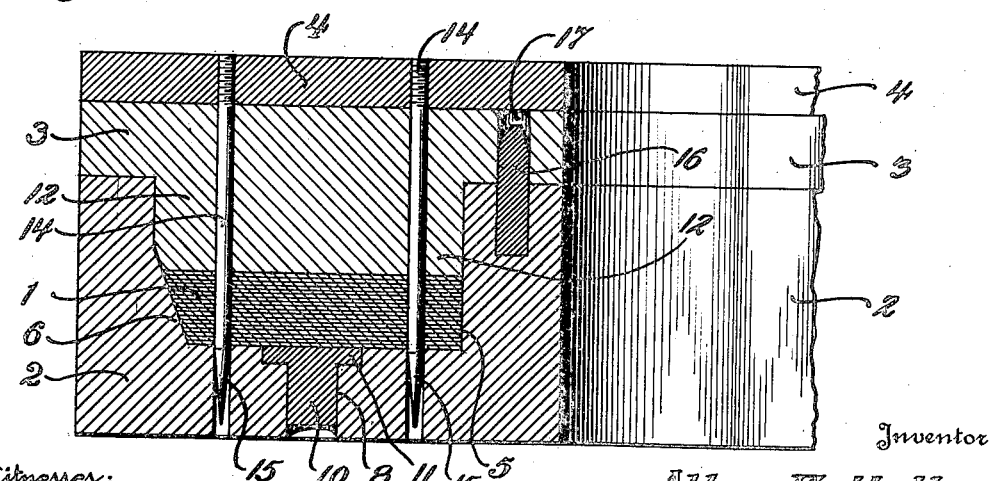
Figure 2 is a fragmentary vertical section on line 2—2 of Figure 1, showing the mold closed and the disk compressed, Figure 3 a like view showing the parts separated, and Figure 4 a plan view of the completed disk, a part only of the perforations being shown.
Figure 3:
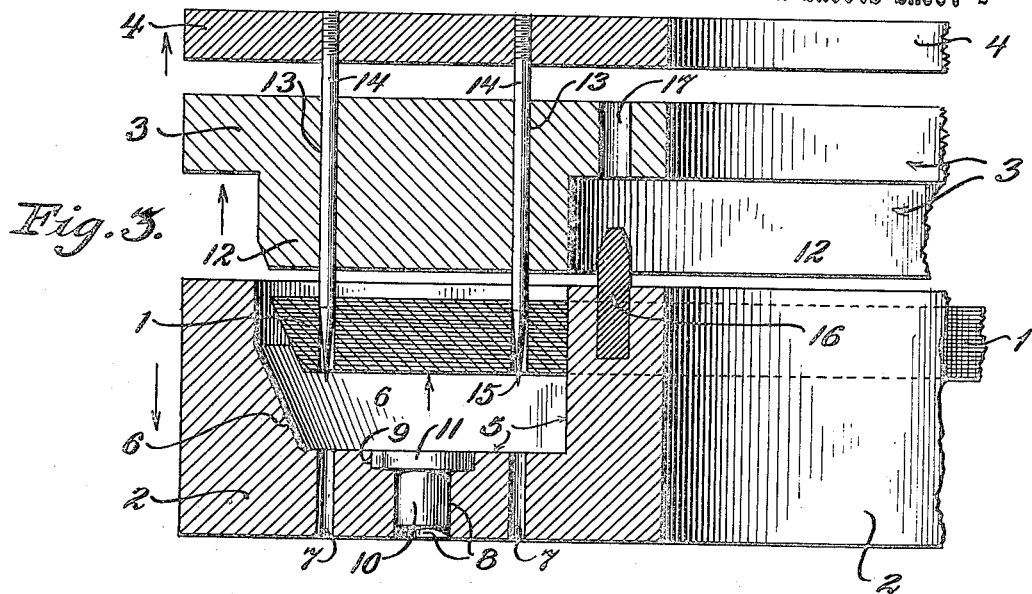
Figure 4:
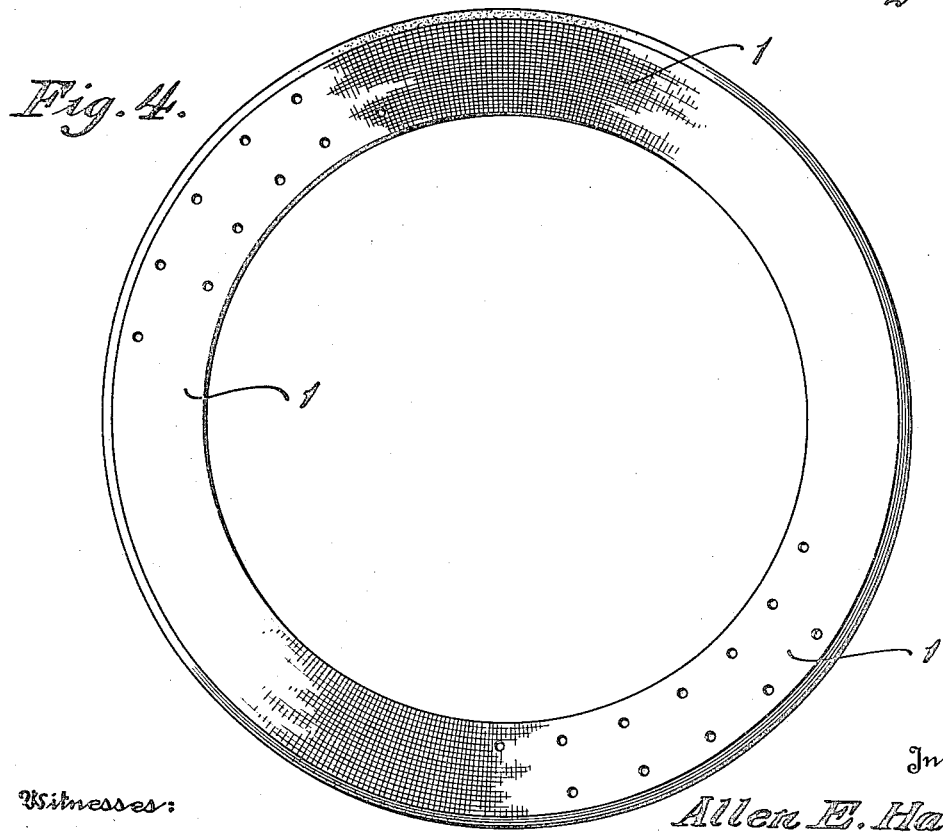

The numeral 1 indicates the annular disk which is composed of fabric, preferably woven in a continuous circularly curved tape of a width somewhat greater than that of the completed disk, impregnated with rubber and built up by layer upon layer to a thickness somewhat greater than that of the completed disk.

The mold is of metal and consists of a bottom die 2 a top die 3 and a follower plate 4, all of which are preferably of annular form. The bottom plate is provided with an annular recess 5 adapted to receive the disk to be compressed and serving as a matrix. The outer wall of the matrix has a part 6 sloping inwardly to the bottom. The bottom wall is provided with two circular series of perforations and apertures 8 having at their inner ends circular countersunk extensions 9 adapted to receive the heads 11 of the ejectors 10. The heads of the ejectors should be flush with the lower wall of the matrix. The top plate has a downwardly extending annular part 12 adapted to take into and closely fit the peripheral walls of the matrix, but not to extend to the bottom thereof, and is provided with two series of perforations 13 registering with the perforations 7 in the bottom plate. The follower plate has fixed therein two circular series of pins 14, preferably of hardened steel, having pointed ends 15 adapted to take through the perforations 13 in the top plate and into the perforations 7 in the bottom plate. The pins are employed to pierce the fabric disk and form the perforations required for securing the disks to rim and hub parts by rivets or bolts. To secure registration of the perforations in the top and bottom plates, one or more dowel pins 16 may be fixed in the bottom plate, and the top plate provided with holes 17 to take over the pins.

The fabric disk, approximately formed as above described, is placed in the matrix, the top plate placed over the bottom plate with its annular extension in the matrix and the follower plate placed over the top plate with the pins 14 taking through the perforations 13. Sufficient pressure is then applied to force the pins through the disk and to compress the disk to the desired extent and mold it to the desired form. The disk is then vulcanized and the top plate and follower plate removed. If the disk adheres to the matrix it may be dislodged by knocking or otherwise applying pressure to the stem of the ejectors.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. In a mold for making vulcanized fabric disks for vehicle wheels, a metallic bottom plate having an annular recess of a contour conforming to that of the disk to be produced, the bottom wall of the recess being perforated; a metallic top plate having an annular part adapted to take into and fit the upper part of the recess and provided with perforations adapted to register with the perforations in the bottom plate, and a follower plate having pins adapted to take through the perforations in the top plate and into the perforations in the bottom plate.

2. In a mold for making vulcanized fabric disks for vehicle wheels, a metallic bottom plate having an annular recess of a contour conforming to that of the disk to be produced, the bottom wall of the recess being perforated; a metallic top plate having an annular part adapted to take into and fit the upper part of the recess and provided with perforations adapted to register with the perforations in the bottom plate, and means for insuring registration of the perforations in the top and bottom plates.

In testimony whereof I have signed my name to this specification in the presence of two subscribing witnesses.

ALLEN E. HALL.

Witnesses:
ELIZABETH GARBE,
CHAS. E. POTTS.